Jan. 13, 1959  S. J. KAMINSKY  2,868,499
PLUG TYPE VALVE
Filed Jan. 10, 1955

Inventor
Stanley J. Kaminsky
by Wright, Brown,
Quinby & May
Attys.

United States Patent Office 2,868,499
Patented Jan. 13, 1959

2,868,499

PLUG TYPE VALVE

Stanley J. Kaminsky, Norwood, Mass., assignor to Industrial Plastic Fabricators, Inc., Norwood, Mass., a corporation of Massachusetts Application January 10, 1955, Serial No. 480,719

2 Claims. (Cl. 251—314)

This invention relates to a valve of the plug type which can be completely opened or closed by a quarter turn of the handle. In piping systems for transmitting corrosive fluids, often under considerable pressure, considerable difficulty has been experienced with valves included in such systems. In order to avoid rapid deterioration of the valves, necessitating frequent renewal, valves for such service are sometimes made of corrosion-resistant material such as a synthetic resin. Valves of the plug type made of such material have heretofore given considerable trouble, especially when used in high-pressure systems, due to rapid wear on the relatively movable surfaces of the plug and the housing in which it is fitted. Plugs in valves of this type are generally tapered and fit in a similarly tapered socket. The magnitude of the pressure on the plug required for a tight valve will depend on the angle of taper and the pressure of the fluid in the system. If the taper angle is large, a correspondingly large pressure on the plug is required, with a resultant frictional drag between the mutually engaging surfaces of the plug and housing. If the taper angle is too small, the plug is apt to bind in the socket.

According to the present invention, materials are used in the plug and housing such as will slide easily on their interfaces, and the angle of taper of the plug and socket is critically selected to afford tightness of the valve with a minimum of pressure on the plug and with freedom of the plug to turn easily. For this purpose the parts of the plug and housing which are in mutual contact are of different materials having a low mutual coefficient of friction. The taper angle of the plug and the socket in which it turns is selected, with reference to the materials employed, so as to produce a fluid-tight valve without excessive axial pressure on the plug or binding of the plug in the socket.

For a more complete understanding of the invention reference may be had to the following description thereof and to the drawings, of which—

Figure 1:
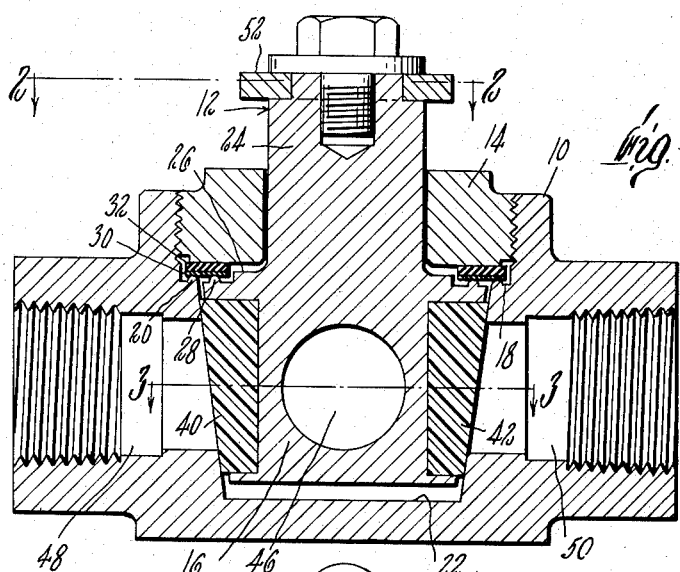
Figure 1 is a section on a vertical longitudinal plane of a plug valve embodying the invention.
Figure 2:
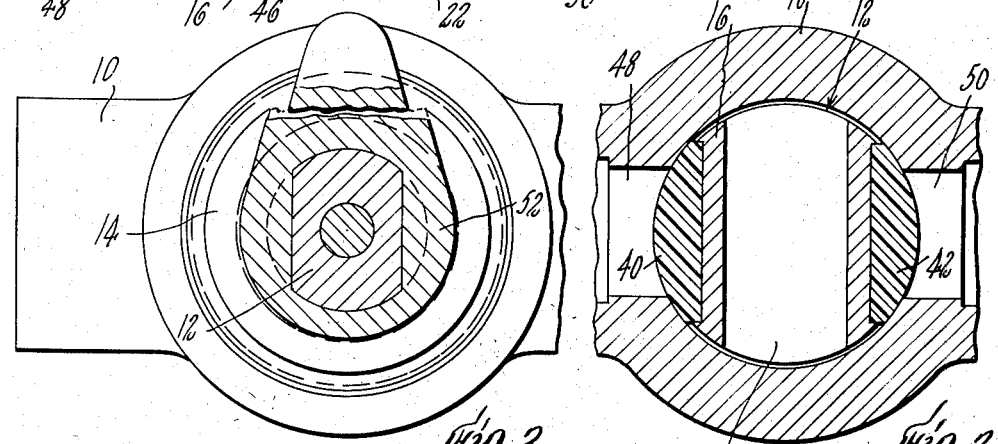
Figure 2 is a plan view of the valve, partly in section on the line 2—2 of Figure 1.

The plug type valve illustrated in the drawing is for convenience of description assumed to be in the upright position shown in Figure 1. The structure comprises a one-piece housing member 10 of corrosion-resistant material such as a polyvinyl chloride resin, a rotatable plug 12 which may be made chiefly of polyvinyl resin, a gland ring 14 to maintain the plug in place, and one or more washers between the ring 14 and the body 16 of the plug 12.

The housing 10 may be fabricated in any suitable manner such, for example, as injection molding. The housing has a central cavity or socket to receive the plug 12 and the gland ring 14. The upper portion of the socket has a screw-threaded wall for engagement with the thread of the ring 14. This portion of the socket terminates in a narrow annular shoulder 18 which is in a horizontal plane and has an upstanding circular rib 20 along its inner edge and integral therewith. The lower portion of the socket is frusto-conical and tapers downwardly from the shoulder 18 to the bottom 22. The angle of taper is 8°, that is, each element of the socket wall makes an angle of 8° with a vertical line.

The body 16 of the plug is frusto-conical, the angle of taper being 8°. Extending up from the body is a cylindrical stem 24 of smaller diameter than the upper or larger end of the body, a stepped horizontal shoulder 26 being thus formed between the stem and body. An upstanding circular rib 28 is on the lower step of the shoulder 26, and integral therewith, this rib being concentric with the rib 20 and with the axis of the plug 12. The ribs 20 and 28 rise to the same level and are engaged by a washer 30 of a suitable corrosion-resistant substance having a low coefficient of friction with polyvinyl chloride resin. Such a substance is tetrafluoroethylene resin, described in U. S. Patent No. 2,230,654 and commercially known as "teflon." This substance has considerable rigidity but is slightly and resiliently deformable under moderate pressures. Bearing on the upper face of the washer 30 is a washer 32 of resilient material such as rubber or an equivalent synthetic rubber or rubber compound. The ring 14 is adjusted to press down on the elastic washer 32 which presses correspondingly downward on the rib 28 and hence on the body 16. This pressure must be carefully regulated since deficient pressure may result in leakage around the plug, while excess pressure results in excessive friction between the plug and the housing in which it turns.

Figure 3:
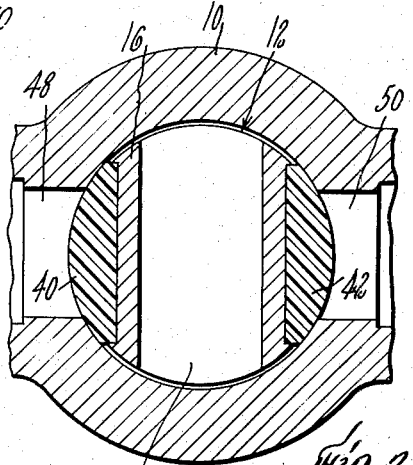
Figure 3 is a section on the line 3—3 of Figure 1.
Figures 4, 5:
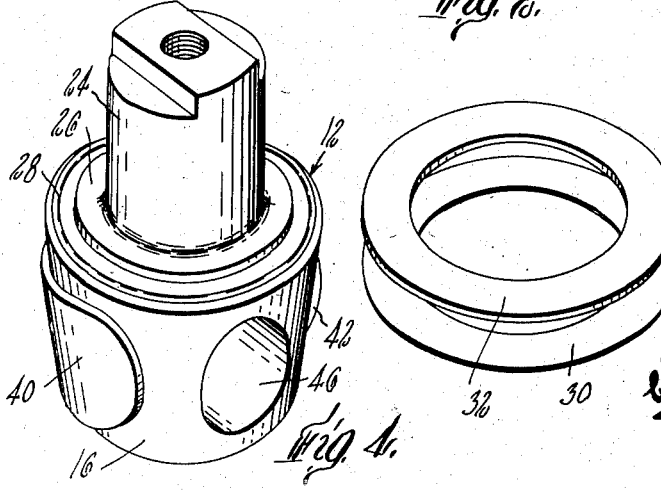
Figure 4 is a perspective view of the plug of the valve.
Figure 5 is a perspective view of two washers used in the valve.

To reduce the friction between the plug and its housing, both of which are made of the same material, two bearing elements 40 and 42 are embedded in the body of the plug and are mounted to project slightly outward from the conical surface of the body 16 so that these bearing elements are the only portions of the plug 12 which touch the housing 10. The bearing elements 40 and 42 are made of a suitable material such as tetrafluoroethylene resin which has a low coefficient of friction with polyvinyl resin. As indicated in Figure 3, the bearing elements 40 and 42 extend into the body 16 far enough to be held therein by a drive fit but not far enough to interfere with a transverse bore 46 which is movable into and out of alignment with the passages 48 and 50 in the housing 10 when the plug 10 is turned to turn the valve on and off. A handle 52 is attached to the upper end of the stem 24 so as to project radially out from the axis of the plug. This can be manipulated in the usual manner to open and close the valve. Its angular position relative to the housing 10 indicates whether the valve is open or closed.

I claim:

1. A plug-type valve for corrosive fluids, comprising a housing of polyvinyl chloride resin having a downwardly tapering chamber therein with inlet and outlet passages opening into opposite sides of the chamber, a plug of polyvinyl chloride having a frusto conical body fitting in said chamber and rotatable therein to open and close the valve, and a stem extending up from said body, said plug having a transverse bore through said body adapted to register with said passages when the plug is in the open valve position, said plug having two bearing elements of tetrafluoroethylene resin embedded in opposite sides of said body and adapted to close said passages when the plug is in the closed valve position, said elements projecting slightly outward from the conical contour of the body, an upstanding rib on the upper end of said body surrounding said stem, a thin washer of tetrafluoroethylene resin bearing on said rib, a thicker washer of resilient rubber-like material upon said thin washer, and a ring of rigid material loosely surrounding a portion of said stem and bearing upon said thicker washer, said ring being in screw threaded engagement with said housing for vertical adjustment.

2. A plug-type valve for corrosive fluids, comprising a housing of polyvinyl chloride resin enclosed at the bottom and having a downwardly tapering chamber therein with inlet and outlet passages opening into opposite sides of the chamber, a plug of polyvinyl chloride having a frusto conical body fitting in said chamber and rotatable therein to open and close the valve, and a stem extending up from said body, said plug having a transverse bore through said body adapted to register with said passages when the plug is in the open valve position, said plug having two bearing elements of tetrafluoroethylene resin embedded in opposite sides of said body and adapted to close said passages when the plug is in the closed valve position, said elements projecting slightly outward from the conical contour of the body, and a packing around said stem arranged to expose only a corrosion resistant surface to the fluid in the valve.

References Cited in the file of this patent

UNITED STATES PATENTS

| | | |
|---|---|---|
| 841,960 | Gray | Jan. 22, 1907 |
| 1,562,195 | Schenck | Nov. 17, 1925 |
| 1,911,344 | Bard | May 30, 1933 |
| 2,372,869 | Wheatley | Apr. 3, 1945 |
| 2,387,013 | Fuller | Oct. 16, 1945 |
| 2,597,976 | Cousins | May 27, 1952 |

FOREIGN PATENTS

| | | |
|---|---|---|
| 170,018 | Great Britain | of 1921 |

OTHER REFERENCES

"Industrial and Engineering Chemistry," vol. 38, 1946 (TP-1-.A58), pp. 871-877, pub. by the American Chemical Society, 1155 16th St., N. W., Washington, D. C. (Copy in Scientific Library.)

"Modern Plastics Encyclopedia, 1948" (TP-986.A2-M5-1948), pp. 152-156. (Copy in Scientific Library.)